US011049318B2

United States Patent
Ikeuchi et al.

(10) Patent No.: US 11,049,318 B2
(45) Date of Patent: Jun. 29, 2021

(54) CONTENT PROVIDING DEVICE, CONTENT PROVIDING METHOD, AND STORAGE MEDIUM

(71) Applicant: HONDA MOTOR CO., LTD., Tokyo (JP)

(72) Inventors: Yasushi Ikeuchi, Wako (JP); Takeyuki Suzuki, Wako (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/693,408

(22) Filed: Nov. 25, 2019

(65) Prior Publication Data

US 2020/0175763 A1 Jun. 4, 2020

(30) Foreign Application Priority Data

Nov. 29, 2018 (JP) .............................. JP2018-223501

(51) Int. Cl.
*G06T 19/00* (2011.01)
*G06F 16/909* (2019.01)
(Continued)

(52) U.S. Cl.
CPC .......... *G06T 19/003* (2013.01); *G06F 16/909* (2019.01); *G06T 19/006* (2013.01); *G06F 16/587* (2019.01); *G06Q 50/14* (2013.01)

(58) Field of Classification Search
None
See application file for complete search history.

(56) References Cited

U.S. PATENT DOCUMENTS 6,496,780 B1 * 12/2002 Harris ..................... G01W 1/04
702/3
2002/0133560 A1 * 9/2002 Hara ...................... G06Q 10/06
709/213
(Continued)

FOREIGN PATENT DOCUMENTS

JP  2005-149430    6/2005
JP  2012-027731    2/2012
(Continued)

OTHER PUBLICATIONS

Author: Dunstall et al.; Title: An Automated Itinerary Planning System for Holiday Travel; Date: 2004; Source: https://pdfs.semanticscholar.org/3a03/deb73c694682d0d3d3f153cf53bffbd53a94.pdf (Year: 2004).*

(Continued)

*Primary Examiner* — Jwalant Amin
(74) *Attorney, Agent, or Firm* — Amin, Turocy & Watson, LLP

(57) ABSTRACT

A content providing device, a content providing method, and a storage medium which allows a user to ascertain a state of a tourist spot on the day of travel are provided. A content providing device includes a first acquirer configured to acquire a travel plan that includes at least a scheduled visit date and a scheduled location to be visited of a user, a second acquirer configured to acquire content that indicates a state of a scheduled location to be visited scheduled or estimated on the scheduled visit date of the user according to an image on the basis of the travel plan, and a reproduction controller configured to cause a reproduction device to reproduce the content.

9 Claims, 5 Drawing Sheets

(51) Int. Cl.
*G06Q 50/14* (2012.01)
*G06F 16/587* (2019.01)

(56) References Cited

U.S. PATENT DOCUMENTS

| | | | |
|---|---|---|---|
| 2009/0248285 A1* | 10/2009 | Bauer | G08G 1/096838 |
| | | | 701/117 |
| 2017/0372390 A1* | 12/2017 | Lokesh | G06Q 30/0613 |
| 2018/0082477 A1* | 3/2018 | Wilde | G06Q 30/0601 |
| 2020/0082430 A1* | 3/2020 | Suzuki | G06Q 10/1093 |
| 2020/0128598 A1* | 4/2020 | Keller | H04W 84/005 |

FOREIGN PATENT DOCUMENTS

| | | |
|---|---|---|
| JP | 2013-066017 | 4/2013 |
| JP | 6390992 | 9/2018 |

OTHER PUBLICATIONS

Author: Cheng et al.; Title: Using Cellular Automata to Reduce Congestion for Tourist Navigation Systems in Mobile Environments; Date: May 15, 2013; Source: https://link.springer.com/article/10.1007/s11277-013-1196-7 (Year: 2013).*

Author: Yusuke Kaite; Title: Website launched in Kyoto to forecast tourist congestion based on Wi-Fi use; Date: Nov. 26, 2018; Source: https://mainichi.jp/english/articles/20181126/p2a/00m/0na/015000c (Year: 2018).*

Japanese Office Action for Japanese Patent Application No. 2018-223501 dated Aug. 11, 2020.

* cited by examiner

| SCHEDULED VISIT DATE | TOURIST SPOT | OPTION | | |
|---|---|---|---|---|
| | | GUIDER | PICK-UP VEHICLE | SERVICE |
| YYYY/MM/DD | THE GREAT WALL | YES | YES | YES |

PL

| TOURIST SPOT | BACKGROUND INFORMATION |
|---|---|
| THE GREAT WALL | * * * |
| SHANGHAI | * * * |
| ... | ... |

121

122

EACH OPTION

| OPTION: SERVICE |
| OPTION: PICK-UP VEHICLE |

OPTION: GUIDER

| DATE | GUIDER IMAGE |
|---|---|
| YYYY/1/1 | ＊＊＊(Mr. A) |
| YYYY/1/2 | ＊＊＊(Mr. B) |
| ... | ... |
| YYYY/12/31 | ＊＊＊ |

CT2

IMv1

IMv2

EACH TOURIST SPOT

| TOURIST SPOT: SHANGHAI |
| TOURIST SPOT: THE GREAT WALL |

| DATE | FEATURE | FEATURE IMAGE |
|---|---|---|
| 20YY/MM/DD ~20YY/MM/DD | ROAD CONSTRUCTION | * * * |

123

CONTENT PROVIDING DEVICE, CONTENT PROVIDING METHOD, AND STORAGE MEDIUM

CROSS-REFERENCE TO RELATED APPLICATION

Priority is claimed on Japanese Patent Application No. 2018-223501, filed Nov. 29, 2018, the content of which is incorporated herein by reference.

BACKGROUND

Field of the Invention

The present invention relates to a content providing device, a content providing method, and a storage medium.

Description of Related Art

Conventionally, a technology that allows a user to have a pseudo experience of a travel plan by providing the user with images and sounds corresponding to the travel plan selected by the user among representative images and sounds of tourist spots acquired in advance is known (for example, Japanese Unexamined Patent Application, Second Publication No. 2012-027731).

SUMMARY

However, in the conventional technology, even though the representative information of each tourist spot can be provided to a user, it is not possible for the user to ascertain information indicating the state of a scheduled location to be visited on the day of travel.

Aspects of the present invention have been made in view of such circumstances, and an object thereof is to provide a content providing device, a content providing method, and a storage medium which allow a user to ascertain a state of a scheduled location to be visited on the day of travel.

An information providing device, a content providing device, a content providing method, and a storage medium according to the present invention have adopted the following configuration.

(1): A content providing device according to one aspect of the present invention includes a first acquirer configured to acquire a travel plan that includes at least a scheduled visit date and a scheduled location to be visited by a user, a second acquirer configured to acquire content that indicates a state of a scheduled location to be visited scheduled or estimated on the scheduled visit date of the user according to an image on the basis of the travel plan, and a reproduction controller configured to cause a reproduction device to reproduce the content.

(2): In the aspect of (1) described above, the image includes a virtual reality image that can be reproduced as an image viewed from a viewpoint when the user who is a viewer of the reproduction device visits the scheduled location to be visited.

(3): In the aspect of (1) described above, the second acquirer acquires, with respect to a basic image based on the travel plan, the content generated by changing, composing, superimposing, or replacing a variable element included in the basic image or an object included in the basic image to an image in a state of being scheduled or estimated on the scheduled visit date.

(4): In the aspect of (1) described above, the content includes an image of a person scheduled to come into contact with the user or an image of an object scheduled to be used on the scheduled visit date as an object.

(5): In the aspect of (4) described above, the person scheduled to come into contact with the user or the object scheduled to be used includes at least one of a guider who guides the user at the scheduled location to be visited on the scheduled visit date, a self-propelled guidance device which guides the user to the scheduled location to be visited on the scheduled visit date, a pick-up vehicle used by the user on the scheduled visit date, and a service operator who performs a service operation on the scheduled visit date.

(6): In the aspect of (4) described above, the person scheduled to come into contact with the user includes a staff member scheduled to work at a facility scheduled to be used by the user on the scheduled visit date.

(7): In the aspect of (3) described above, a variable element of the basic image includes weather of the scheduled visiting place predicted on the scheduled visit date.

(8): In the aspect of (3) described above, the variable element of the basic image includes a congestion state of the schedule visit place predicted on the scheduled visit date.

(9): A content providing method according to another aspect of the present invention includes, by computer, acquiring a travel plan which includes at least a scheduled visit date and a scheduled visiting place of a user, acquiring content which indicates a state of a scheduled location to be visited scheduled or estimated on the scheduled visit date of the user according to an image on the basis of the travel plan, and causing a reproduction device to reproduce the content.

(10): A storage medium according to still another aspect of the present invention is a storage medium which causes a computer to acquire a travel plan including at least a scheduled visit date and a scheduled location to be visited of a user, acquire content which indicates a state of a scheduled location to be visited scheduled or estimated on the scheduled visit date of the user according to an image on the basis of the travel plan, and cause a reproduction device to reproduce the content.

According to (1) to (10), it is possible to allow a user to ascertain the state of a tourist spot on the day of travel.

According to (2) to (4), it is possible to allow a user to ascertain information related to a travel plan of a user on the day of travel. As a result, it is possible to prevent the user from being confused about a destination at a tourist spot.

According to (5) to (7), it is possible to allow the user to ascertain characteristic events that can occur at the tourist spot on the day of travel. As a result, readiness before a visit can be given.

DESCRIPTION OF EMBODIMENTS

Hereinafter, an embodiment of a content providing device, a content providing method, and a storage medium will be described with reference to the drawings.

Embodiment

Figures 1, 2:
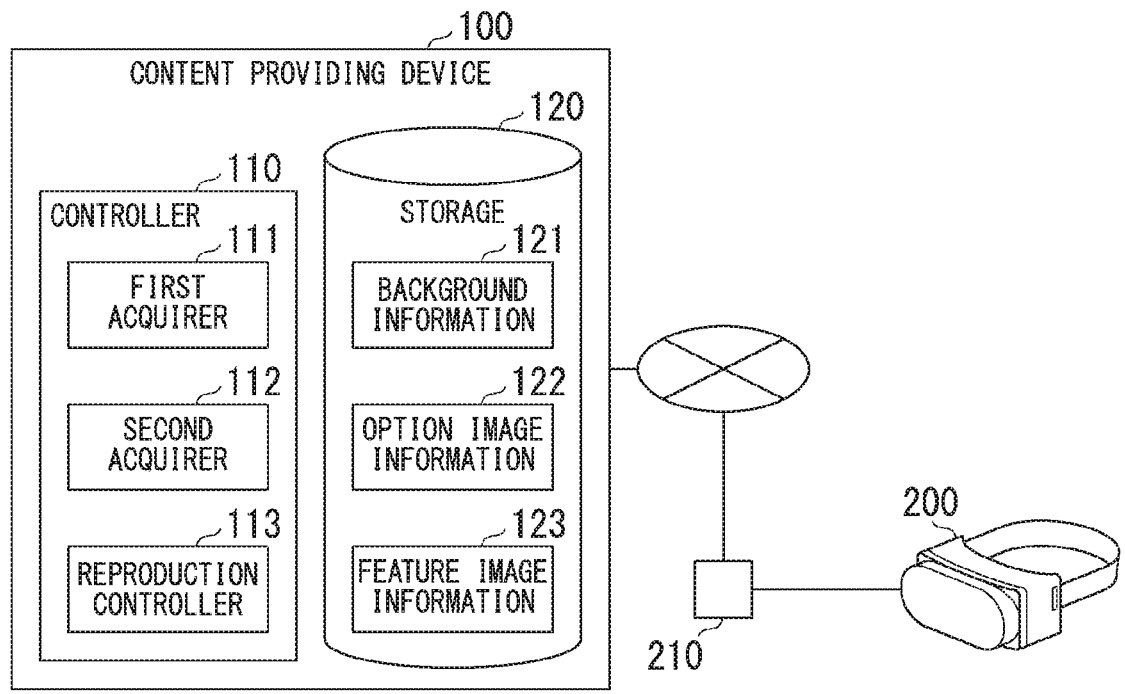
FIG. 1 is a diagram which shows an example of a configuration of a content providing device according to an embodiment.
FIG. 2 is a diagram which shows an example of content of travel plan information.

FIG. 1 is a diagram which shows an example of a configuration of a content providing device 100 according to an embodiment. The content providing device 100 is a device which causes a reproduction device 200 to reproduce various types of content of a scheduled location to be visited that a user plans to visit on a trip. A relay device 210 accesses the content providing device 100 and supplies the acquired content to the reproduction device 200 via the Internet. The relay device 210 is realized by, for example, a portable communication terminal device such as a smartphone, a portable personal computer such as a tablet computer (tablet PC), or the like. The content providing device 100 is a cloud server that provides content to a plurality of reproduction devices 200 or relay devices 210. In the following description, it is assumed that content includes sound and video. The content providing device 100 may also include a function of the relay device 210. In this case, the content providing device 100 is a stand-alone device.

The content providing device 100 communicates with the relay device 210 using the Internet, a Wi-Fi network, Bluetooth (registered trademark), a wide area network (WAN), a local area network (LAN), or the like, and transmits or receives various types of data to or from the relay device 210. The relay device 210 communicates with the reproduction device 200 using the Wi-Fi network, the Bluetooth, a wired LAN, or the like, and provides various types of data received from the content providing device 100 to the reproduction device 200. When the content providing device 100 is a stand-alone device, communication between the content providing device 100 and the reproduction device 200 is similar to communication between the relay device 210 and the reproduction device 200.

The reproduction device 200 is, for example, a head-mounted device. The reproduction device 200 includes, for example, a display such as a virtual screen, and reproduces various types of content related to a scheduled location to be visited of a user provided by the content providing device 100. In the following description, it is assumed that the scheduled location to be visited is a tourist spot. The user can experience scenes of the tourist spot shown in various types of content reproduced by the reproduction device 200 as if they were actually scenes in the vicinity of himself or herself, using the reproduction device 200.

The reproduction device 200 may be a device other than a head mount device. For example, the reproduction device 200 is a terminal device that is used by a user, and may be a display provided in a portable communication terminal device such as a smartphone, a portable personal computer such as a tablet computer (tablet PC), or the like, and may also be a liquid crystal display, an organic electro-luminescence (EL), or the like.

The content providing device 100 includes, for example, a controller 110 and a storage 120. The controller 110 realizes functional units of a first acquirer 111, a second acquirer 112, and a reproduction controller 113 by, for example, a processor such as a central processing unit (CPU) implementing a program (software). Some or all of these components may be realized by hardware (circuit unit; including circuitry) such as a large scale integration (LSI), an application specific integrated circuit (ASIC), a field-programmable gate array (FPGA), or a graphic processing unit (GPU), and may also be realized by cooperation of software and hardware.

The storage 120 may be realized by a storage device (a storage device having a non-transitory storage medium) such as a hard disk drive (HDD) or a flash memory, may be realized by a detachable storage medium (a non-transitory storage medium) such as a DVD or a CD-ROM, and may be a storage medium attached to a drive device. A part or all parts of the storage 120 may be an external device that can be accessed by the content providing device 100, such as a NAS or an external storage server. For example, information such as background information 121, option image information 122, and feature image information 123 is stored in the storage 120. Details of the various types of information will be described below.

The first acquirer 111 acquires, for example, travel plan information PL indicating a travel plan of a user from a management device of a travel agency or a terminal device of the user. FIG. 2 is a diagram which shows an example of content of the travel plan information PL. As shown in FIG. 2, the travel plan information PL is, for example, information in which a tourist spot that a user plans to visit on a trip, a scheduled visit date on which a user plans to visit the tourist spot, and whether an option of the trip is used are associated with one another. The option includes, for example, a guider that performs guidance for a user to a tourist spot or conducts reception at an airport counter or the like as a staff member, a pick-up vehicle used by the user on the scheduled visit date, a service received by the user at the tourist spot, and the like.

Returning to FIG. 1, the second acquirer 112 acquires content indicating the state of the tourist spot on the scheduled visit date of the user using a virtual reality image on the basis of the travel plan information PL acquired by the first acquirer 111. The reproduction controller 113 provides the content acquired by the second acquirer 112 to the reproduction device 200 and causes the reproduction device 200 to reproduce the provided content.

The second acquirer 112 may acquire content by generating content for itself, or may acquire at least some content from other units. In the following description, it is assumed that the second acquirer 112 generates content for itself.

Figures 3, 4:
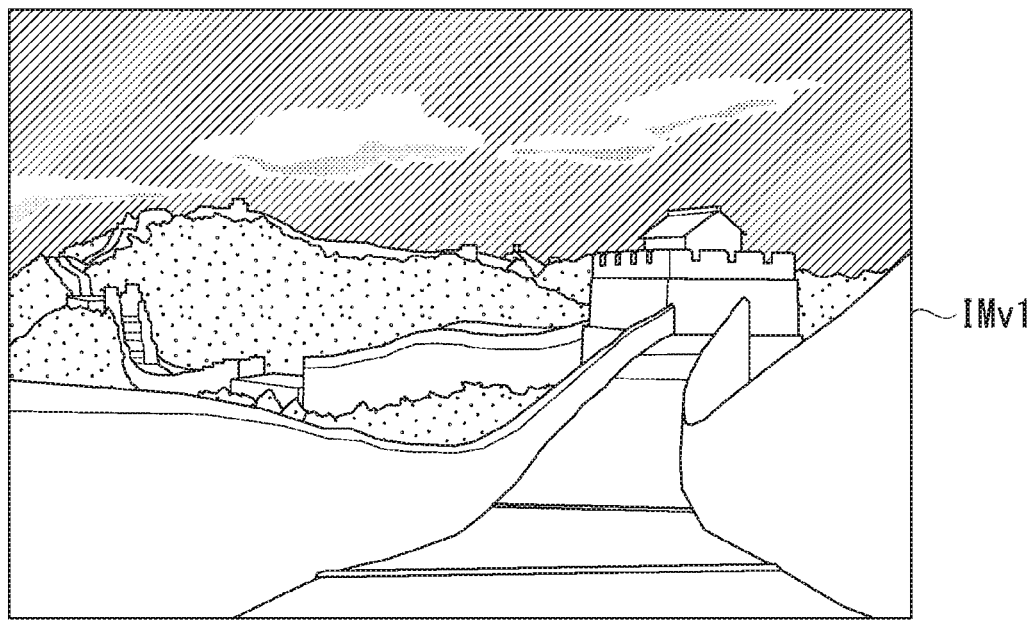
FIG. 3 is a diagram which shows an example of content of background information.
FIG. 4 is a diagram which shows an example of content.

The second acquirer 112 acquires a background image associated with a tourist spot from the background information 121 on the basis of the tourist spot included in the travel plan information PL. FIG. 3 is a diagram which shows an example of content of the background information 121. As shown in FIG. 3, the background information 121 is information in which a name of a tourist spot and background information indicating a state of the tourist spot are associated with each other. The background information is, for example, computer-aided design (CAD) data indicating an arrangement of an actual object at the tourist spot, and includes the state of the tourist spot collected in advance by a distance sensor or the like. The second acquirer 112 generates (acquires) a background polygon image in a mode that changes an image in accordance with a user walking virtually on the basis of the background information. The second acquirer 112 may generate, for example, a background polygon image in a mode that changes an image in accordance with the direction a user faces and on the basis of a detection result of a motion sensor provided in the reproduction device 200.

FIG. 4 is a diagram which shows an example of content CT1. In FIG. 4, a background polygon image IMv1 indicating the entirety of the tourist spot is included in the content CT1. The second acquirer 112 generates the content CT1 including the background polygon image IMv1. The reproduction controller 113 provides the content CT1 generated by the second acquirer 112 to the reproduction device 200 via the relay device 210 and causes it to be reproduced. The user can ascertain the state of the tourist spot by confirming the content CT1.

The content CT1 may include an image obtained by actually capturing the tourist spot instead of the background polygon image IMv1. In this case, a plurality of images obtained by capturing the tourist spot according to a desired position and a desired direction are acquired in advance, and the second acquirer 112 generates the content CT1 in a mode that changes an image to be reproduced by the reproduction device 200 among the plurality of images in accordance with a virtual position of the user or a face direction (line of sight) of the user. In this case, for example, the reproduction controller 113 collectively transmits a set of content CT1 in accordance with the position or face direction of the user to the relay device 210, and the relay device 210 may read the content CT1 in accordance with the position or face direction of the user and provide it to the reproduction device 200. Even though the background polygon image IMv1 is generated, the set of the content CT1 in accordance with the position or face direction of the user can be collectively transmitted to the relay device 210, and the relay device 210 may read the content CT1 in accordance with the position or face direction of the user and provide it to the reproduction device 200.

The content CT1 may be different depending on weather. In this case, the second acquirer 112 generates the content CT1 in which a weather effect image for each type of weather is superimposed on the background polygon image IMv1. The second acquirer 112 may generate an inherently different background polygon image IMv1 for each type of weather, and select a background polygon image IMv1 in accordance with expected weather. By confirming this content CT1, a user can ascertain the state of a tourist spot for each type of weather on the day of a scheduled visit date. As a result, the user can prepare an umbrella for rainy weather or prepare a hat for clear weather.

When the scheduled visit date included in the travel plan information PL is a date when an event (for example, an event or a festival) is taking place at a tourist spot, an event image indicating the event may be added to the content CT1. In the event image, for example, a congestion state in the event may be indicated in addition to scenes of the event. In this case, for example, the second acquirer 112 generates the content CT1 in which an event image is superimposed on the background polygon image IMv1. The second acquirer 112 may generate the content CT1 including the background polygon image IMv1 on which the event image is originally superimposed. The event image is, for example, an image in which an event performed in the past is reproduced by a polygon image or the like. The event image may be reproduced by an image in which the tourist spot at the event time is actually imaged instead of being reproduced by a polygon image or the like. By confirming this content CT1, the user can ascertain the state of an event of the tourist spot on the day of the scheduled visit date. As a result, the user can avoid congestion or ascertain an uncongested area in advance.

Figures 5, 6:
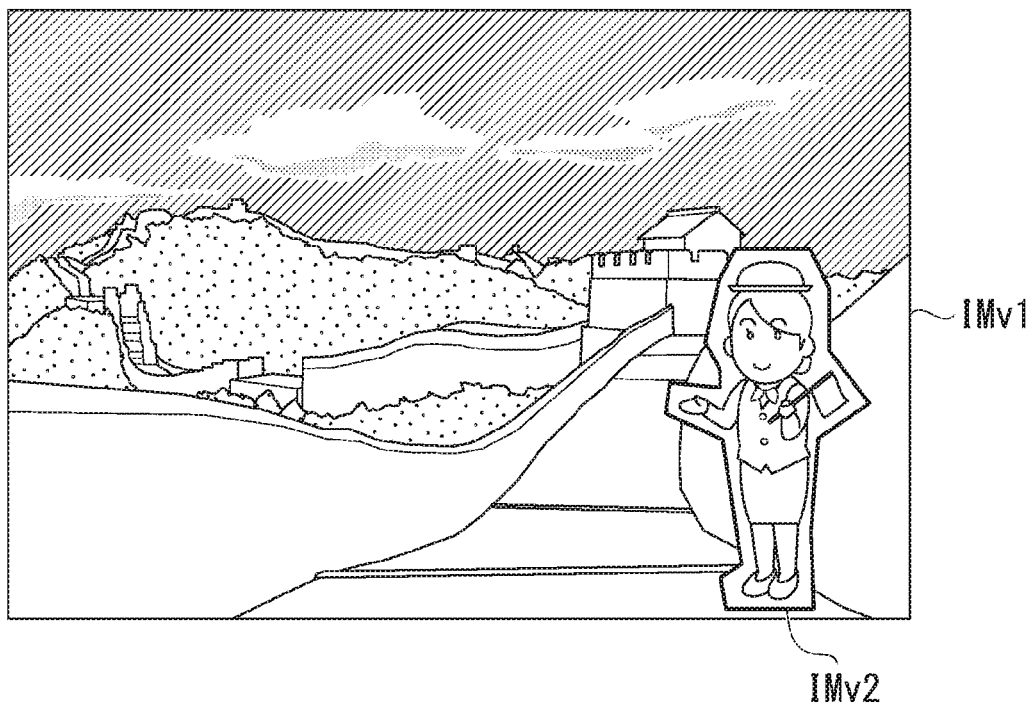
FIG. 5 is a diagram which shows an example of content of option image information.
FIG. 6 is a diagram which shows an example of content including an option image.

The second acquirer 112, on the basis of a scheduled visit date and an option included in the travel plan information PL, acquires an option image in which the scheduled visit date is associated with the option from the option image information 122. FIG. 5 is a diagram which shows an example of content of the option image information 122. As shown in FIG. 5, the option image information 122 is information in which a date and an image of an option are associated with each other for each option. The date is, for example, a date that is in the future from a timing at which the travel plan information PL is acquired. The option image is a reproduction of a state of an option on an associated date according to an image in which the option has actually been imaged. The second acquirer 112 generates content CT2 in the background polygon image IMv1 using the acquired option image.

For example, when the option is a guider, in the option image information 122, a date and an image (hereinafter, a guider image) indicating a guider that is estimated or is scheduled to work on the date are associated with each other. The date is associated with the guider image on the basis of a work schedule of a guider acquired from a scheduler or the like to which the work schedule of a guider is input. The second acquirer 112 adds the guider image of the guider estimated to work on the scheduled visit date to the background polygon image IMv1 as an image indicating the state of the guider, and generates the content CT2 on the basis of the option image information 122. The guider image is, for example, an image obtained by capturing how each guider actually guides a user (for example, how each guider actually welcomes a user) in advance, and the second acquirer 112 may generate the content CT2 in a mode in which the guider image is changed in accordance with a virtual walking of the user in the background polygon image IMv1. For example, the second acquirer 112 may dispose the guider image in the background polygon image IMv1 such that the guider walks in front of the user and generates the content CT2. The guider image is an image including a face and clothing such as a uniform of the guider, the content CT2 includes the guider image, and thereby it is possible to make it easy for the user to identify an actual guider at the visiting place.

In FIG. 5, when it is indicated that a guider who performs guidance work of a user on a date of "YYYY/1/1" is "Mr. A," and a guider who performs guidance work of a user on a date of "YYYY/1/2" is "Mr. B" in the work schedule, "YYYY/1/1" is associated with a guider image in which "Mr. A" is captured, and "YYYY/1/2" is associated with a guider image in which "Mr. B" is captured in the option image information 122.

For example, when the option is a pick-up vehicle, a date and an image (hereinafter, a pick-up vehicle image) indicating a pick-up vehicle estimated to operate on the date are associated with each other in the option image information 122. The date is associated with the pick-up vehicle image on the basis of an operation schedule of a pick-up vehicle. The second acquirer 112 adds a pick-up image of a pick-up vehicle estimated to operate on a scheduled visit date to the background polygon image IMv1 as an image indicating the state of the pick-up vehicle, and generates the content CT2 on the basis of the option image information 122. The pick-up vehicle image is, for example, an image in which an exterior and an interior of respective pick-up vehicles have been imaged in advance when the respective pick-up vehicles were actually stopping or traveling, and the second acquirer 112 may generates the content CT2 in a mode in which the pick-up vehicle image is changed in accordance with the user virtually boarding the pick-up vehicle and moving in the background polygon image IMv1. For example, the second acquirer 112 may dispose the background polygon image IMv1 and the pick-up vehicle image such that it looks as if a guider has boarded a stopping pick-up vehicle and has been moved by the pick-up vehicle after boarding, and generates the content CT2. The pick-up vehicle image is an image that includes a stop position or a drop-off position for actually picking up a user. The content CT2 includes the pick-up vehicle image, and thereby a user can easily identify an actual pick-up vehicle in a visiting place, and can ascertain a place to get on or get off more clearly.

For example, when the option is a service, a date and an image (hereinafter, referred to as a service person image) indicating a service person estimated to work on the date and provide a corresponding service to a user are associated with each other in the option image information 122. The date is associated with the service person image on the basis of a work schedule of a service person. The second acquirer 112 adds a service person image of a service person estimated to work on a scheduled visit date to the background polygon image IMv1 as an image indicating the state of the service person on the basis of the option image information 122, and generates the content CT2. The service person image is, for example, an image obtained by capturing how each service person actually provides service to a user (for example, how each service person actually responds to a user) in advance, and the second acquirer 112 may also generate the content CT2 in a mode in which the service person image is changed in accordance with a user virtually walking in the background polygon image IMv1. For example, the second acquirer 112 disposes the service person image in the background polygon image IMv1 such that it looks as if the service person stands in front of the user and responds to the user, and generates the content CT2.

FIG. 6 is a diagram which shows an example of content CT2 including an option image. In FIG. 6, the content CT2 includes the background polygon image IMv1 described above and a guider image IMv2 indicating a state of a guider associated with a scheduled visit date. The reproduction controller 113 provides the content CT2 generated by the second acquirer 112 to the reproduction device 200 via the relay device 210, and causes it to be reproduced. The user can ascertain a face of a guider who guides himself on the day of a scheduled visit date in advance and can smoothly join the guider by confirming the content CT2.

The option image included in the option image information 122 may be an image in which the state of an option is reproduced by a polygon image or the like instead of an image in which the option is actually captured. The guider may be a self-propelled guidance device (for example, a self-propelled robot) instead of a person. In this case, a self-propelled guidance device image is an image in which the state of a self-propelled guidance device on an associated date is reproduced by an image actually captured by the self-propelled guidance device, or an image in which the state is reproduced by a polygon image or the like.

The option image information 122 may include an image other than the service person image. For example, when content of a service is "ceramic art classroom," the second acquirer 112 generates an image captured from a viewpoint when a user actually experiences the ceramic art classroom as the content CT2. The second acquirer 112 may generate a polygon image looking as if the user actually experiences the ceramic art classroom, dispose the generated polygon image in the background polygon image IMv1, and generate content CT.

Figures 7, 8:
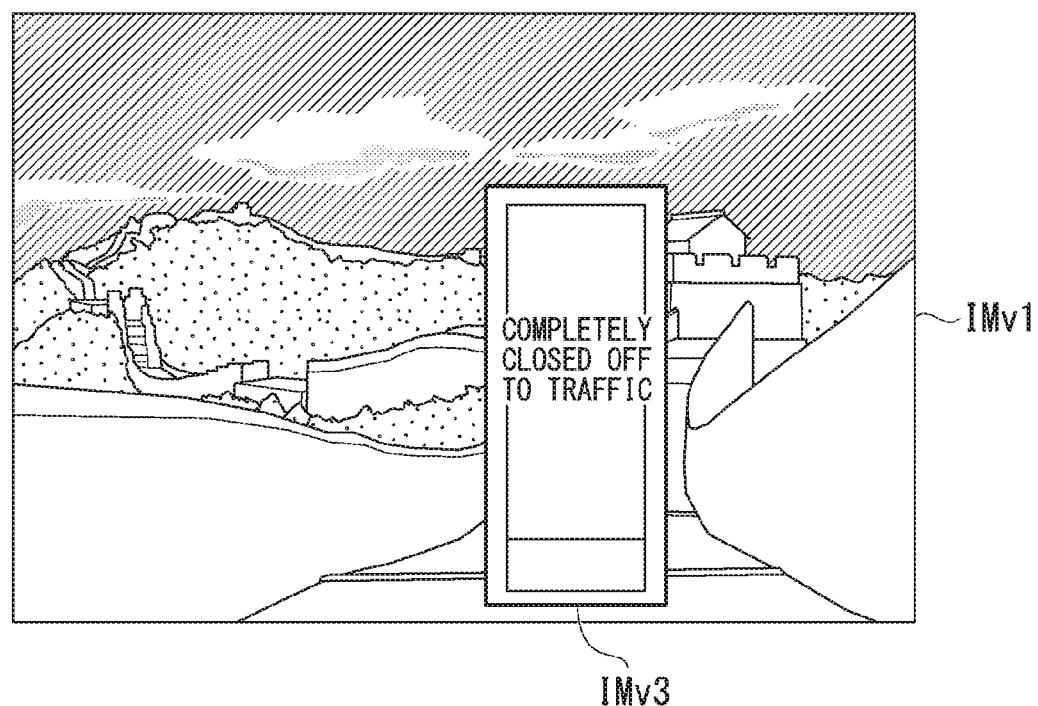
FIG. 7 is a diagram which shows an example of content of feature image information.
FIG. 8 is a diagram which shows an example of content including a feature image.

The second acquirer 112, on the basis of a scheduled visit date included in the travel plan information PL, acquires a feature image associated with the scheduled visit date from the feature image information 123. FIG. 7 is a diagram which shows an example of content of the feature image information 123. As shown in FIG. 7, the feature image information 123 is information in which a date and a feature image are associated with each other for each tourist spot. The date is, for example, a date that is in the future from a timing at which the travel plan information PL is acquired. The feature image is an image indicating an event which may occur or is scheduled to occur but does not normally occur at a tourist spot (for example, construction or building repairing at a tourist spot) on the associated date. The feature image is, for example, an image in which the feature of a tourist spot on the associated date is reproduced by a polygon image or the like. For example, the second acquirer 112 may dispose a feature image at a position of an object from which the feature image may be generated among respective objects configuring a tourist spot indicated by the background polygon image IMv1, and generate content CT3.

The feature image included in the feature image information 123 may be reproduced by an image whose feature is actually captured, instead of being reproduced by a polygon image or the like.

For example, when the feature of a tourist spot is road construction, a date and an image (hereinafter, a construction image) related to the construction that may occur or is scheduled to occur on the date are associated with each other in the feature image information 123. The date is associated with a construction image on the basis of a construction schedule. The second acquirer 112 adds a construction image of a construction which may occur or is scheduled to occur at the scheduled visit date on the basis of the feature image information 123 to the background polygon image IMv1 as an image indicating the state of the feature of a tourist spot, and generates the content CT3. The construction image is, for example, an image in which a standing signboard or the like installed along with the construction is actually imaged in advance, and the second acquirer 112 may generate the content CT3 in a mode in which the construction image is changed in accordance with a virtual position of the user in the background polygon image IMv1. For example, the second acquirer 112 disposes the construction image in the background polygon image IMv1 such that it looks as if the standing signboard is set at an absolute position, and generates the content CT3.

FIG. 8 is a diagram which shows an example of the content CT3 including a feature image. In FIG. 8, the background polygon image IMv1 described above and a feature image IMv3 indicating a state of features of a tourist spot associated with the scheduled visit date are included in the content CT3. The reproduction controller 113 provides the content CT3 generated by the second acquirer 112 to the reproduction device 200 via the relay device 210, and causes the reproduction device 200 to reproduce it. By confirming the content CT3, the user can ascertain an event which may occur or an event scheduled to occur on the day of the scheduled visit date in advance, and can respond smoothly to the event.

As described above, it is described that the reproduction device 200 reproduces content provided from the reproduction controller 113 via the relay device 210, but the present invention is not limited thereto. The reproduction device 200 may also include a storage (not shown), and a functional unit that performs reproduction processing of content stored in the storage. In this case, for example, the reproduction device 200 may store content provided from the content providing device 100 in the storage, and reproduce the content at a predetermined timing (for example, on the basis of an operation of the reproduction device 200 of the user).

[Operation Flow]

Figure 9:
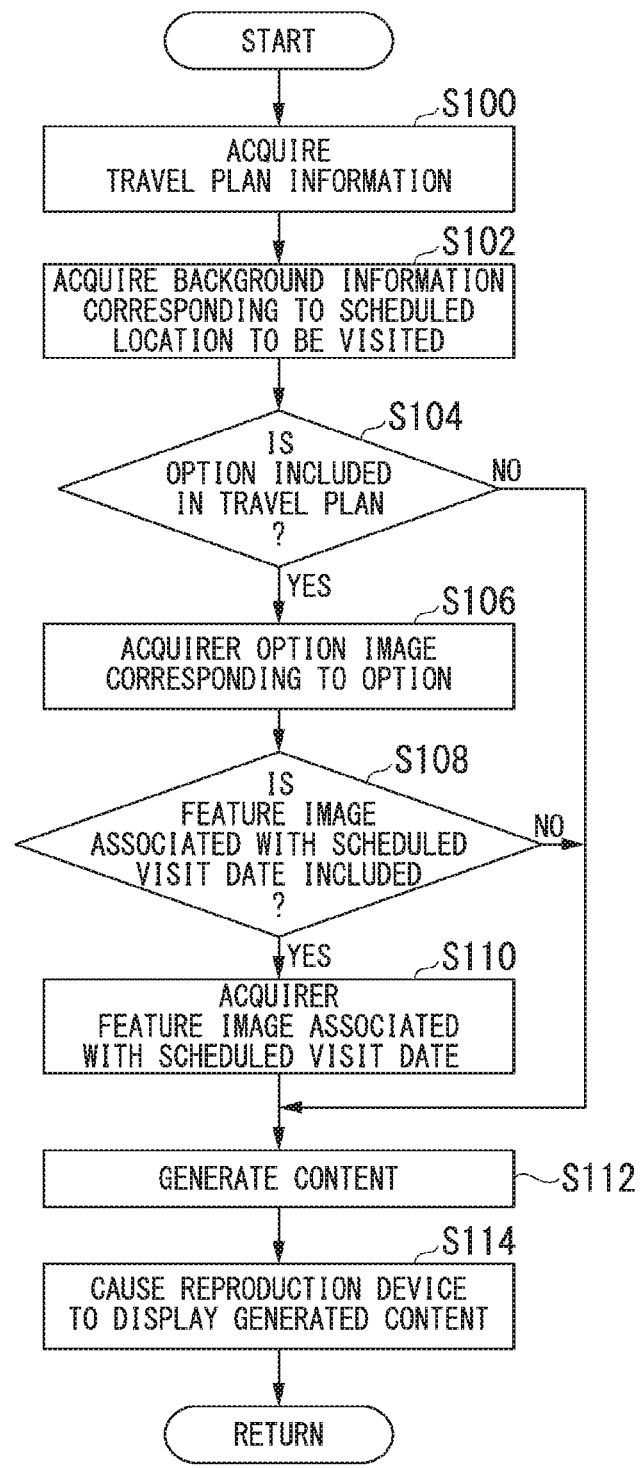
FIG. 9 is a flowchart which shows an example of flow of a series of operations of the content providing device.

FIG. 9 is a flowchart which shows an example of a flow of a series of operations of the content providing device 100. The first acquirer 111 acquires travel plan information PL which indicates a travel plan of a user from a management device of a travel agency or a terminal device of a user (step S100). Next, the second acquirer 112 acquires a background image corresponding to a tourist spot included in the travel plan information PL on the basis of the background information 121 (step S102). Next, the second acquirer 112 determines whether it is indicated that an option is used in the travel plan information PL (step S104). When it is determined that the option is not used in the travel plan information PL, the second acquirer 112 proceeds the processing to step S112. When it is determined that the option is used in the travel plan information PL, the second acquirer 112 acquires an option image corresponding to a scheduled visit date and an option included in the travel plan information PL on the basis of the option image information 122 (step S106).

Next, the second acquirer 112 determines whether a feature image associated with a scheduled visit date included in the travel plan information PL is included in the feature image information 123 (step S108). When it is determined that a feature image associated with a scheduled visit date included in the travel plan information PL is not included in the feature image information 123, the second acquirer 112 proceeds the processing to step S112. When it is determined that a feature image associated with a scheduled visit date included in the travel plan information PL is included in the feature image information 123, the second acquirer 112 acquires the feature image (step S110). Next, the second acquirer 112 generates content including the acquired one or more images (step S112). Then, the reproduction controller 113 provides the content generated by the second acquirer 112 to the reproduction device 200 via the relay device 210, and causes the reproduction device 200 to reproduce the provided content (step S114).

Summary of Embodiment

As described above, the content providing device 100 according to the embodiment includes the first acquirer 111 that acquires travel plan information PL including at least the scheduled visit date and the scheduled location to be visited (the tourist spot in this example) of a user, a second acquirer 112 that acquires content indicating the state of a tourist spot on the scheduled visit date of a user using the background polygon image IMv1 on the basis of a travel plan, and a reproduction controller 113 that causes the reproduction device 200 to reproduce the content. The second acquirer 112 can generate content C of the state reflecting the state scheduled or estimated on the day by combining, superimposing, or replacing a polygon image, an option image, and a feature image that configure the content CT with an image of the state scheduled or estimated on the day of the scheduled location to be visited on the scheduled visit date, and allow the user to ascertain the state of a tourist spot on the day of travel.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A content providing device comprising:
a processor implementing a software, a hardware comprising circuitries, or a cooperation of the software and the hardware configured to acquire a travel plan that includes at least a scheduled visit date and a scheduled location to be visited of a user;
the processor implementing the software, the hardware comprising the circuitries, or the cooperation of the software and the hardware configured to acquire content that indicates a state of a scheduled location to be visited scheduled or estimated on the scheduled visit date of the user according to an image on the basis of the travel plan; and
the processor implementing the software, the hardware comprising the circuitries, or the cooperation of the software and the hardware configured to cause a reproduction device to reproduce the content, wherein
the content comprises an image of a person scheduled to come into contact with the user, and
the person scheduled to come into contact with the user includes a staff member scheduled to work at a facility scheduled to be used by the user on the scheduled visit date.

2. The content providing device according to claim 1, wherein the image is a virtual reality image that can be reproduced as an image viewed from a viewpoint when the user who is a viewer of the reproduction device visits the scheduled location to be visited.

3. The content providing device according to claim 1, wherein the processor comprising the software, the hardware including the circuitries, or the cooperation of the software and the hardware acquires, with respect to a basic image based on the travel plan, the content generated by changing, composing, superimposing, or replacing a variable element included in the basic image or an object included in the basic image to an image in a state of being scheduled or estimated on the scheduled visit date.

4. The content providing device according to claim 3, wherein the variable element of the basic image based on the travel plan includes weather of the scheduled location to be visited predicted on the scheduled visit date.

5. The content providing device according to claim 3, wherein the variable element of the basic image based on the travel plan includes a congestion state of the scheduled location to be visited predicted on the scheduled visit date.

6. The content providing device according to claim 1, wherein the content further includes an image of an object scheduled to be used on the scheduled visit date as an object.

7. The content providing device according to claim 6, wherein the person scheduled to come into contact with the user or the object scheduled to be used is at least one of a guider who guides the user at the scheduled location to be visited on the scheduled visit date, a self-propelled guidance device which guides the user to the scheduled location to be visited on the scheduled visit date, a pick-up vehicle used by the user on the scheduled visit date, and a service operator who performs a service operation on the scheduled visit date.

8. A content providing method comprising:
by computer,
acquiring a travel plan which includes at least a scheduled visit date and a scheduled location to be visited of a user;
acquiring content which indicates a state of a scheduled location to be visited scheduled or estimated on the scheduled visit date of the user according to an image on the basis of the travel plan; and
causing a reproduction device to reproduce the content, wherein
the content comprises an image of a person scheduled to come into contact with the user, and
the person scheduled to come into contact with the user includes a staff member scheduled to work at a facility scheduled to be used by the user on the scheduled visit date.

9. A non-transitory computer readable storage medium that causes a computer to
acquire a travel plan including at least a scheduled visit date and a scheduled location to be visited of a user;
acquire content which indicates a state of a scheduled location to be visited scheduled or estimated on the scheduled visit date of the user according to an image on the basis of the travel plan; and
cause a reproduction device to reproduce the content, wherein
the content comprises an image of a person scheduled to come into contact with the user, and
the person scheduled to come into contact with the user includes a staff member scheduled to work at a facility scheduled to be used by the user on the scheduled visit date.

* * * * *